US010843541B2

(12) United States Patent
Schreiber et al.

(10) Patent No.: US 10,843,541 B2
(45) Date of Patent: Nov. 24, 2020

(54) DRIVE CABLE HAVING A PLASTICS CABLE BODY

(71) Applicants: WEBASTO SE, Stockdorf (DE); Bekaert Advanced Cords Aalter NV, Aalter (BE)

(72) Inventors: Ulrich Schreiber, Stockdorf (DE); Chris Dhulst, Oeselgem (BE); Katrien Bert, Eksaarde (BE)

(73) Assignees: WEBASTO SE, Stockdorf (DE); BEKAERT ADVANCED CORDS AALTER NV, Aalter (BE)

( * ) Notice: Subject to any disclaimer, the term of this patent is extended or adjusted under 35 U.S.C. 154(b) by 0 days.

(21) Appl. No.: 16/081,116

(22) PCT Filed: Feb. 7, 2017

(86) PCT No.: PCT/EP2017/052589
§ 371 (c)(1),
(2) Date: Aug. 30, 2018

(87) PCT Pub. No.: WO2017/153103
PCT Pub. Date: Sep. 14, 2017

(65) Prior Publication Data
US 2019/0084389 A1    Mar. 21, 2019

(30) Foreign Application Priority Data

Mar. 7, 2016    (EP) .................................. 16158982

(51) Int. Cl.
*B60J 7/057*  (2006.01)
*B60J 7/02*   (2006.01)
*F16C 1/16*   (2006.01)

(52) U.S. Cl.
CPC ............... *B60J 7/0573* (2013.01); *B60J 7/02* (2013.01); *F16C 1/16* (2013.01); *F16C 2326/01* (2013.01)

(58) Field of Classification Search
CPC .. B60J 7/0573; B60J 7/02; B60J 7/057; F16C 1/16; F16C 1/14; F16C 1/145
See application file for complete search history.

(56) References Cited

U.S. PATENT DOCUMENTS 3,206,998 A  *  9/1965  Hill ........................ G05G 7/10
                                                    74/494
3,766,801 A  *  10/1973 Wiegand ............. B63H 21/265
                                                    74/480 B
(Continued)

FOREIGN PATENT DOCUMENTS

DE          2912666 A1    10/1979
DE      102012105372 A1   12/2013
(Continued)

OTHER PUBLICATIONS

International Search Report for PCT/EP2017/052589 dated May 19, 2017 (7 Pages).

*Primary Examiner* — Thomas C Diaz
(74) *Attorney, Agent, or Firm* — Fitch, Even, Tabin & Flannery, LLP

(57) ABSTRACT

The invention proposes a drive cable for actuating an element being movable relative to a structure, comprising a cable body which is made of plastics, and which comprises a denticulation extending in the axial direction for engaging a mating denticulation as well as at least one armouring, which continuously reaches through the cable body in the axial direction. A coupling element realised as a moulded section is moulded in a cable connecting region so as to
(Continued)

adjoin the cable body. Said coupling element shows a connecting portion for being coupled to the moveable element.

8 Claims, 18 Drawing Sheets

(56) References Cited

U.S. PATENT DOCUMENTS

| | | | | |
|---|---|---|---|---|
| 3,838,607 A * | 10/1974 | Hemens | ................ | B63H 25/10 |
| | | | | 74/496 |
| 5,337,621 A * | 8/1994 | Spease | .................... | F16C 1/262 |
| | | | | 264/275 |
| 6,024,404 A * | 2/2000 | Stallfort | ................... | B60J 7/057 |
| | | | | 296/216.04 |
| 8,961,061 B2 * | 2/2015 | Wahlberg | .............. | F16G 11/025 |
| | | | | 403/275 |

FOREIGN PATENT DOCUMENTS

| | | | | |
|---|---|---|---|---|
| EP | 0499135 A1 * | 8/1992 | ............ | F16H 55/26 |
| FR | 1011827 A | 6/1952 | | |
| GB | 1595251 A | 8/1981 | | |
| WO | 2007/128290 A1 | 11/2007 | | |
| WO | 2015173007 A1 | 11/2015 | | |
| WO | 2017041970 A1 | 3/2017 | | |

* cited by examiner

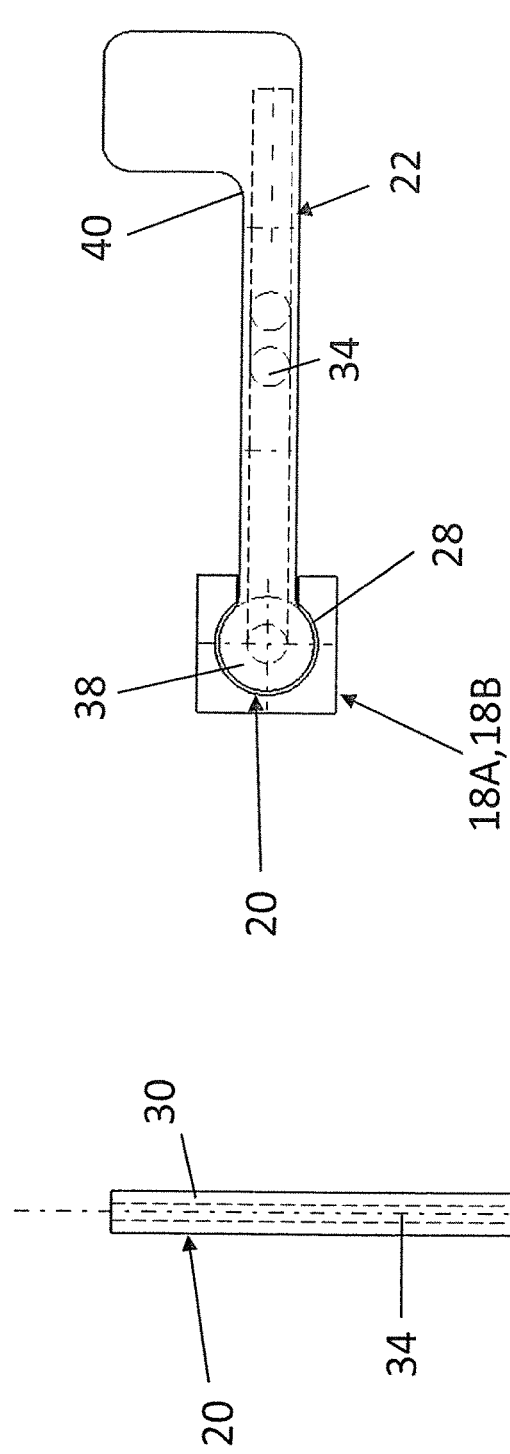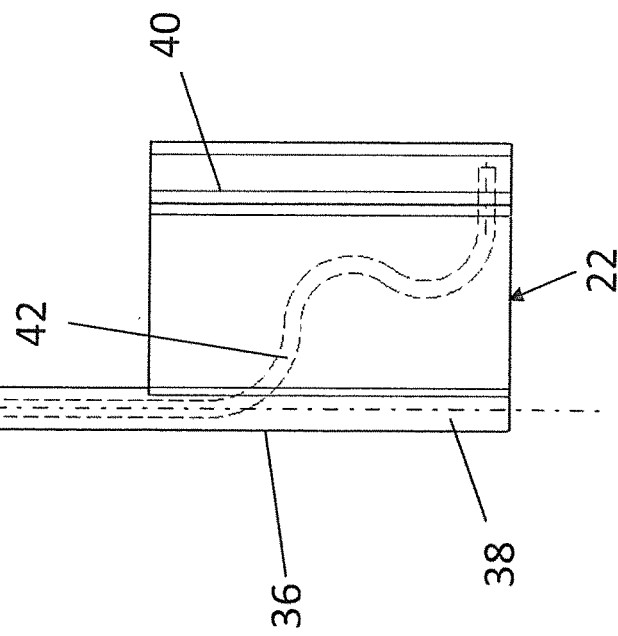

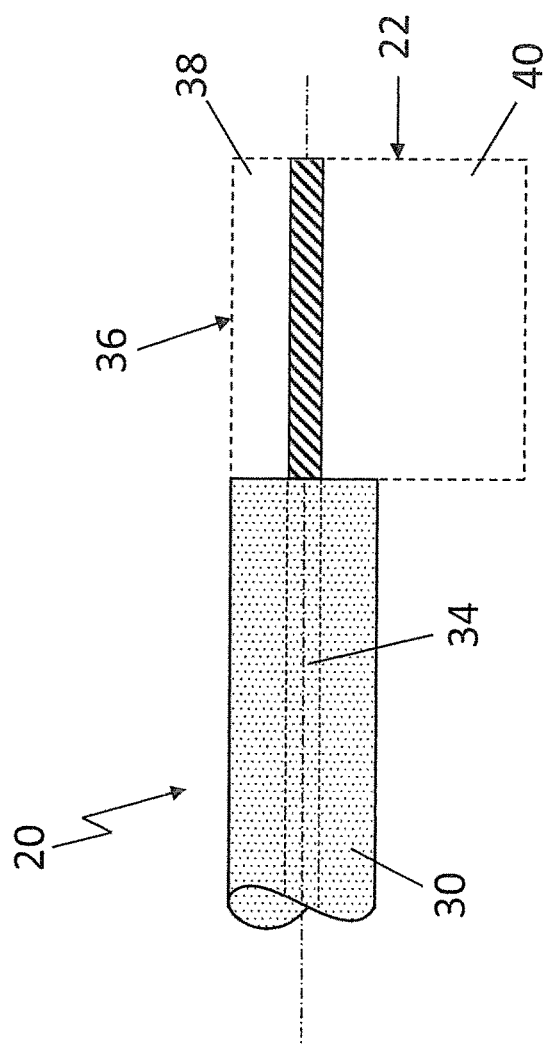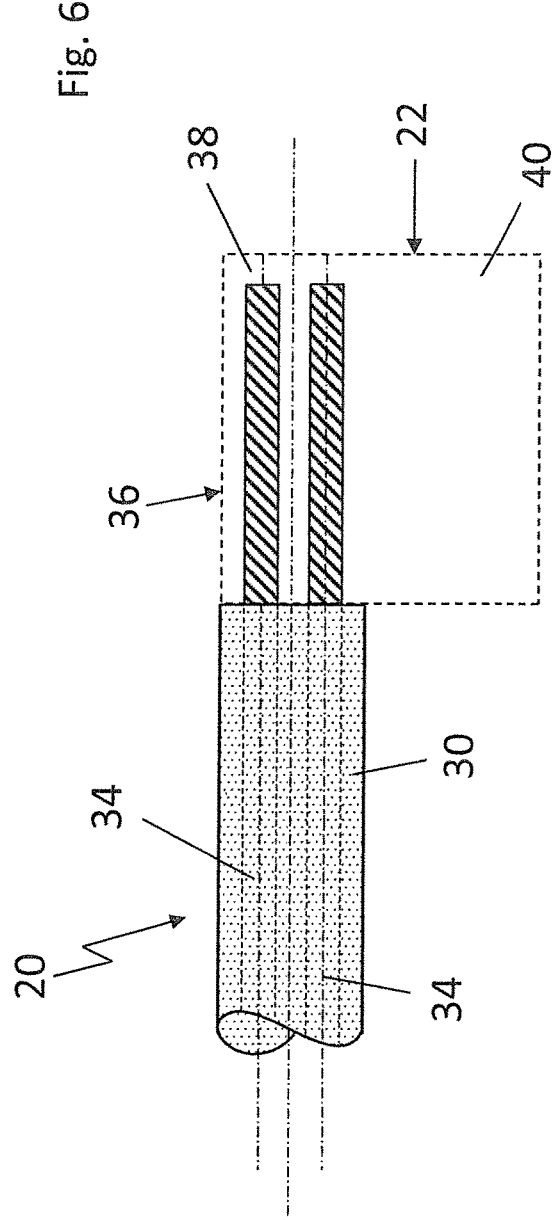

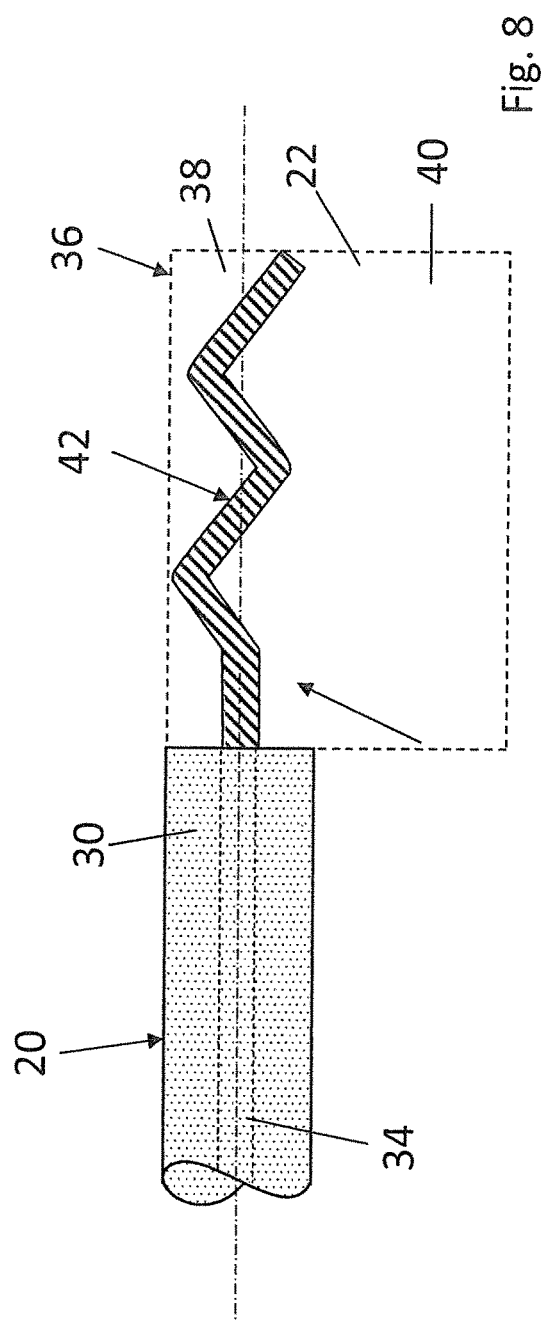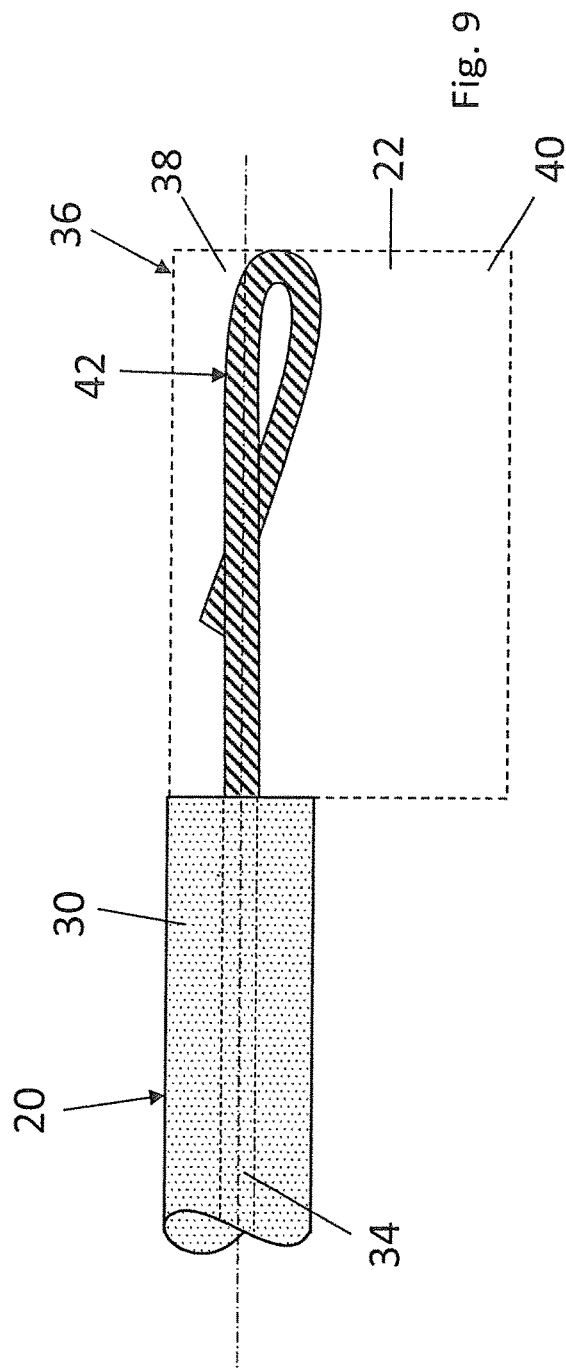

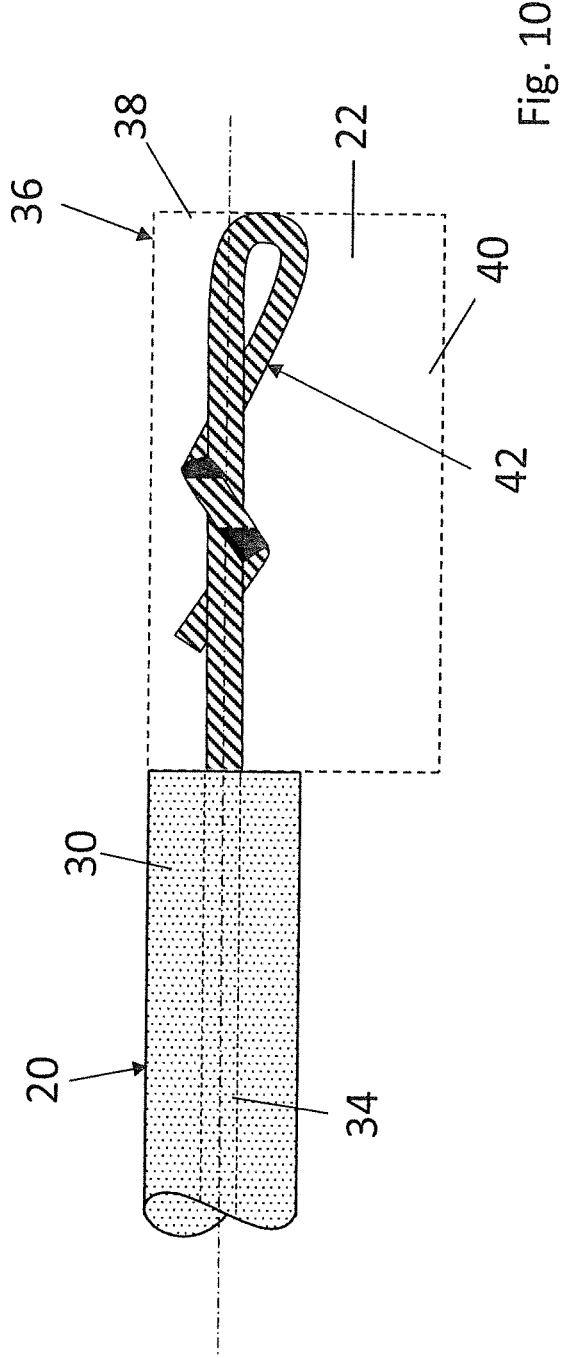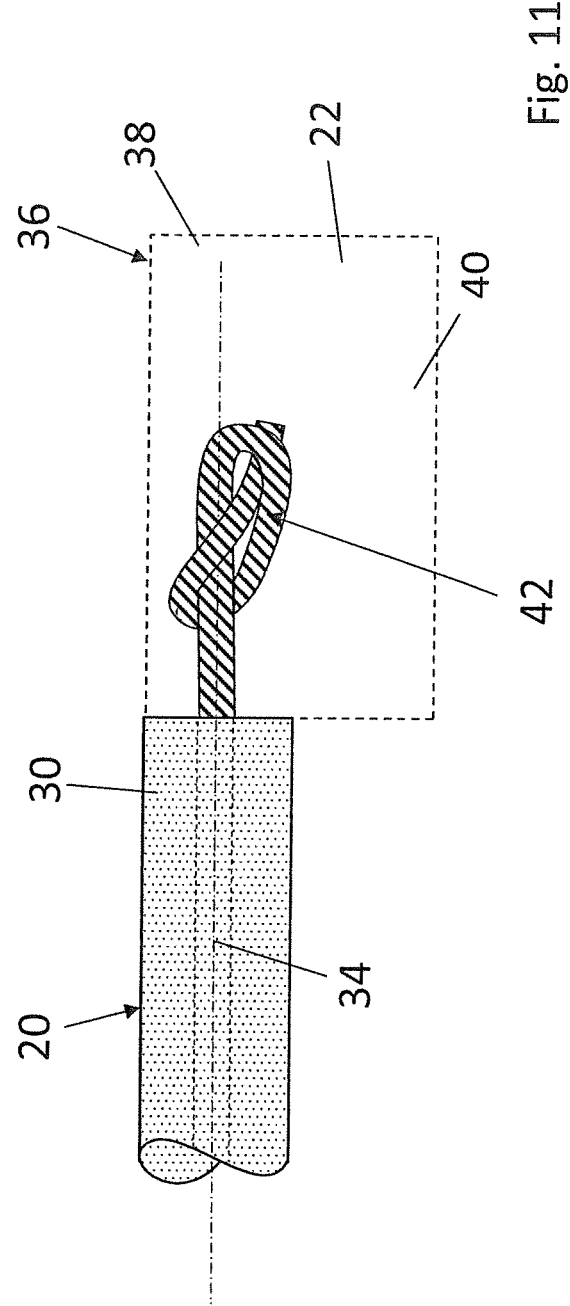

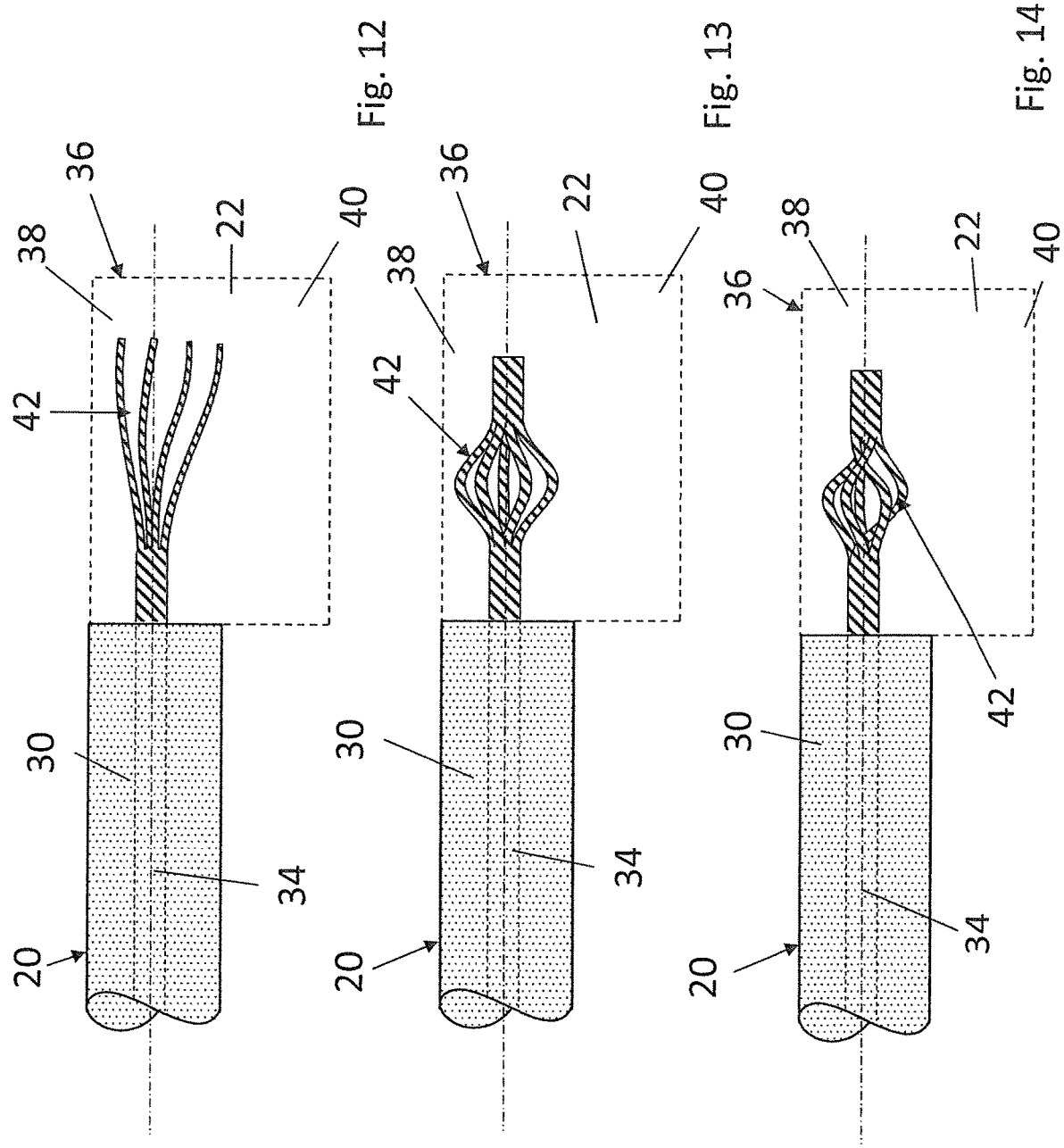

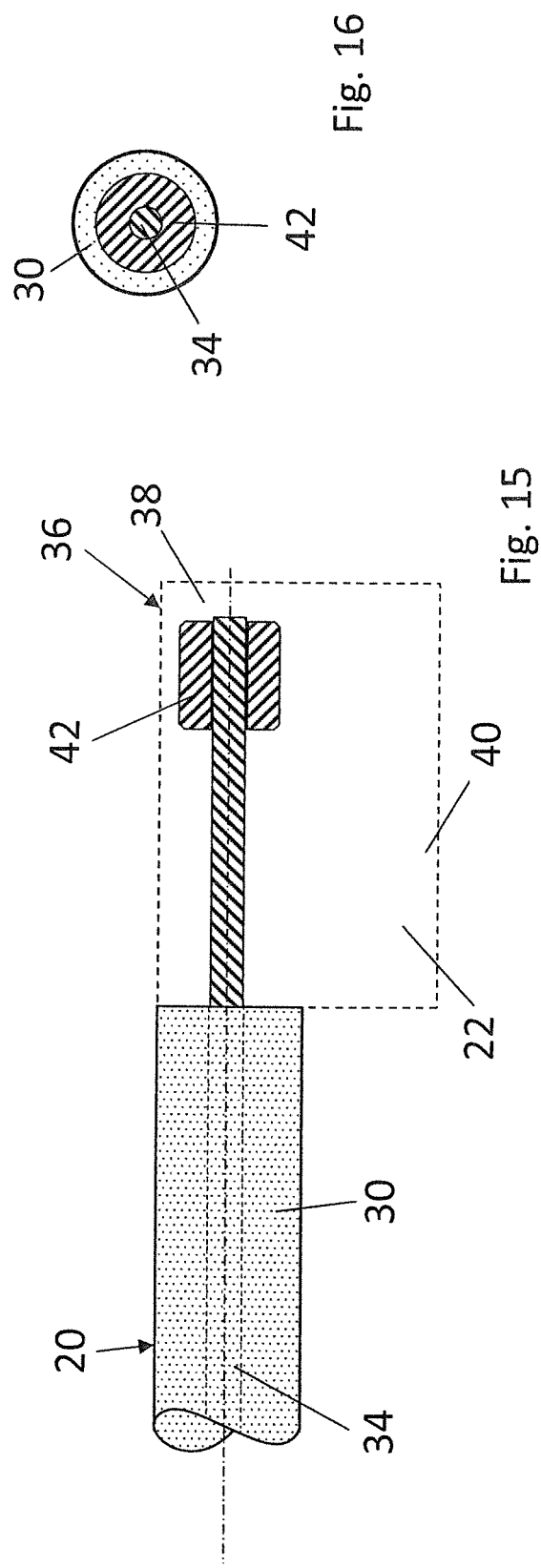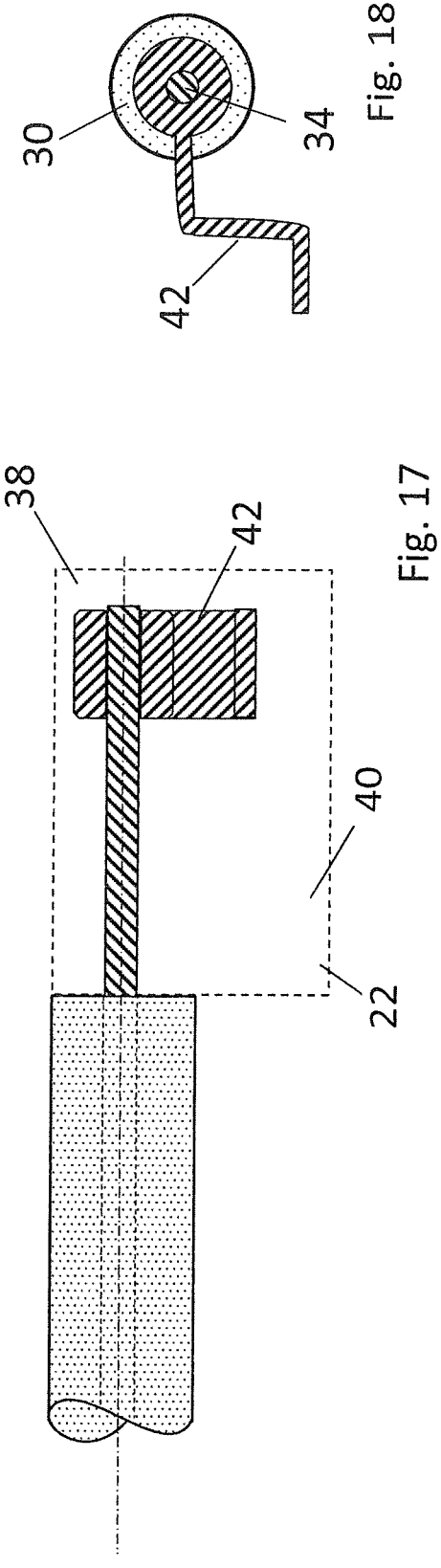

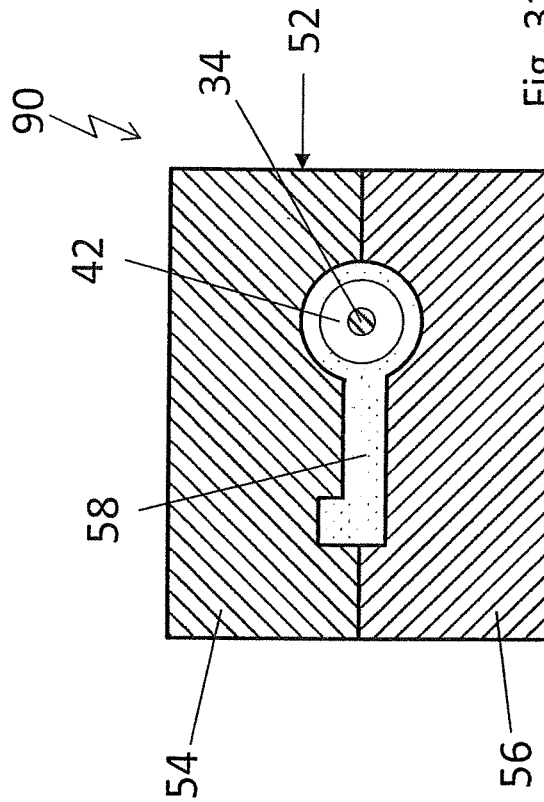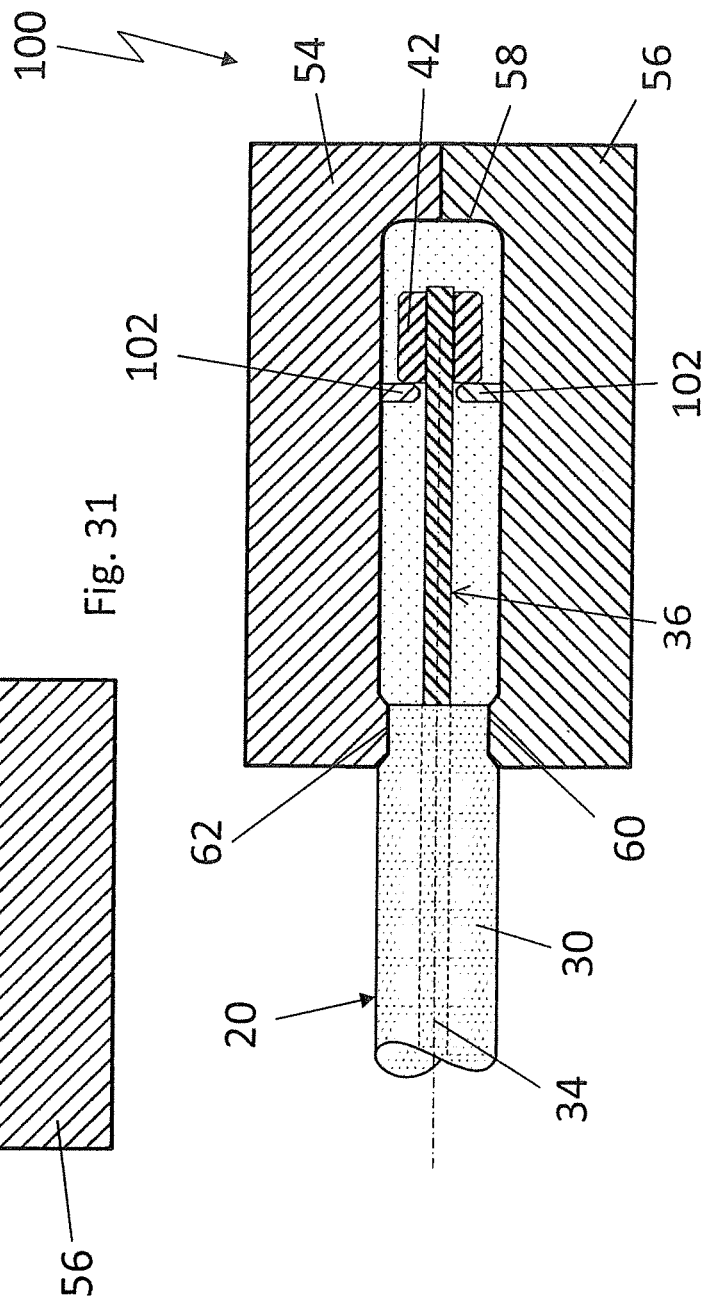

DRIVE CABLE HAVING A PLASTICS CABLE BODY

CROSS-REFERENCE TO RELATED APPLICATIONS

This application is a U.S. national phase application filed under 35 U.S.C. § 371 of International Application No. PCT/EP2017/052589, filed Feb. 7, 2017, designating the United States, which claims priority from European Patent Application No. 16 158 982.5, filed Mar. 7, 2016, which are hereby incorporated herein by reference in their entirety for all purposes.

FIELD

The invention relates to a drive cable for actuating a structural element being movable as against a structure, having the features of the preamble of claim 1.

BACKGROUND

Drive cables of this kind are known from practice and serve to actuate, for example in the context of a motor vehicle, a lid element of a sliding roof arrangement, which lid element constitutes a movable structural element and with the aid of which a roof opening of the relevant vehicle may selectively be closed or at the very least partially be cleared. The drive cable transmits a drive force from a drive motor onto the lid element and comprises a cable body which is made of plastics, and is provided with an armouring. The armouring reaches through the cable body in the axial direction thereof. Moreover, over at least part of the periphery of the cable body, a denticulation is realised which extends in the axial direction, and which serves to engage a mating denticulation formed by a driving wheel of the drive motor. The armouring gives the needed stability to the drive cable.

With plastics drive cables of the afore described kind, the problem of stable connecting to the movable structural element to be actuated has not been solved to date.

SUMMARY

It is the object of the invention to create a drive cable of the type referred to in the introduction, in a simple manner being connectable to the structural element movable against the structure and having sufficient stability in the resulting region of connecting so as to also withstand high forces.

In accordance with the invention, this object is attained by the drive cable having the features of claim 1.

In accordance with the invention, a drive cable is thus proposed, for actuating an element being movable with respect to a structure, comprising a cable body which is made of one or more plastics and which comprises a denticulation extending in the axial direction for engaging a mating denticulation as well as at least one armouring, which continuously reaches through the cable body in the axial direction. For coupling the drive cable to the movable structural element, the drive cable includes a coupling element which is realised as a moulded section, and which is moulded in a cable connecting region so as to adjoin the cable body and includes a coupling portion for being coupled to the moveable element.

The drive cable according to the invention thus includes a moulded portion, manufactured in the connecting region of the cable according to a moulding method, in particular to an injection moulding method, and adjoining the cable body. The moulded portion formed by the coupling element defines the overmoulded length of the cable. For the purpose of coupling to the movable element, the coupling element includes a coupling portion, which may for example project in relation to the axis of the drive cable in the radial direction, from a joining portion or support portion, whose peripheral face is preferably flush with the peripheral face of the cable body. Hence, the coupling element may directly be guided in a guide track of a guide rail, in which the drive cable is also guided.

The connecting region of the cable is the region of the cable, where it is coupled to the moveable element to be driven, and may be an end region of the cable. However, the connecting region may be any other region along the cable suitable for coupling it to the moveable element to be driven.

In a preferred embodiment of the drive cable according to the invention, the coupling element reaches around the armouring, wherein it is directly moulded onto the same. By directly joining the coupling element to the armouring, that means in a cable region free of the cable body, high peel or racking forces may be realised, that means it is possible to connect the coupling element to the drive cable so fixedly that it does not even get detached from the drive cable or from the cable body under high forces. For the present purpose, high forces are for example forces that are higher than half of the breaking load of the drive cable.

For further stabilising the joining of the coupling element to the drive cable, it is advantageous if an anchor element is provided for anchoring the coupling element to the armouring of the drive cable. By way of the anchor element, the position of the coupling element is also securely kept up as against the cable body when large forces act in the axial direction of the cable. By the anchor element, the contact surface between the coupling element and the armouring is increased.

The anchor element for the coupling element may be realised in different manners. For example, a deformed armouring portion forms the anchor element or the anchor element may also be a separate piece fixed to the armouring. Combinations of the different anchor elements are also conceivable.

A deformed armouring portion for forming the anchor element may for example be realised by an armouring loop, by one or more kinks or bends of the armouring or by a knot of the armouring.

Moreover, the deformed armouring portion, being projected in the longitudinal direction of the cable, for enlarging the contact face between the coupling element and the armouring and hence for forming the anchor element, may be outside of the cross-section of the cable body, wherein it is always embedded into the coupling element.

In a preferred embodiment of the drive cable according to the invention, the armouring of the drive cable comprises one or more wires of filaments twisted together. By locally untwisting the wire, an anchor element for the coupling element can conveniently formed. The anchor element can also be formed by untwisting and fanning out the filaments at the wire end thereby forming the anchor element.

An anchor element that is realised as a separate piece is, for example, a crimp sleeve or a tab, which has a special shape and extends in the radial direction in relation to the axis of the armouring.

If the armouring includes several armouring harnesses, the anchor element may be formed by a connecting region of two armouring harnesses. For example, the two armouring harnesses are knotted for this purpose.

In a special embodiment of the drive cable according to the invention, an annular-collar-like portion of the cable body forms the anchor element, an armouring portion abutting on said portion in the longitudinal direction of the cable, and the coupling element directly being moulded onto the armouring portion. Before moulding the coupling element onto the armouring portion, the cable body, in this embodiment, is removed in a portion spaced apart from the cable end, such that the coupling element may get caught at the remaining end-side and annular-collar-like portion of the cable body.

It is also conceivable that the coupling element is directly moulded onto the periphery of the cable body. In this case, it is advantageous if, in the region of joining for the coupling element, the cable body, at the periphery, includes a structured anchor surface for the coupling element. The anchor face is, for example, realised by a roughening or ribbing of the periphery of the cable body or also by the denticulation. The structured anchor surface, which may be generated by working the plastics of the cable body, makes additional anchor forces for the coupling element available, such that the coupling element may also withstand high tensile forces.

The drive cable according to the invention is in particular a drive cable for a movable roof element of a motor vehicle. In this way, the drive cable, with its coupling element, may be joined to a drive slide of a sliding roof mechanism of a motor vehicle or also to a shading system of a vehicle roof.

Subject-matter of the invention is also a tool for moulding a coupling element being realised as an injection moulded section to a drive cable, which serves to actuate a structural element being movable as against a structure and comprises a cable body which is made of plastics, and which includes a denticulation extending in the axial direction for engaging a mating denticulation as well as at least one armouring, which continuously reaches through the cable body in the axial direction. The tool comprises a tool mould having a mould cavity, which corresponds to the coupling element and includes an opening, via which the drive cable can be introduced into the mould cavity and whose cross section is designed according to the cross section of the cable body.

In a preferred embodiment of the tool according to the invention, the diameter of the opening is smaller than the diameter of the cable body, so that the plastics of the cable body is used for sealing the mould cavity in the region of the opening, to be more precise in such a manner that the tool mould wall, in which the opening is realised, engages the plastics or the polymer of the cable body in the closed position of the tool mould, in this way sealing the mould cavity. Thus, a robust sealing concept is achieved, wherein excess material or burrs can be securely avoided.

The opening is in particular a sealing-free opening, so that the opening comprises no wearing part.

In order to be able to position the drive cable in the tool for positionally accurate moulding of the coupling element, the tool mould preferably has a holding element for the armouring of the drive cable. In this embodiment, the armouring thus takes up a defined position during the injection moulding process carried out with the help of the tool.

In a special embodiment of the overmoulding tool according to the invention, in which an anchor element for the coupling element may also be manufactured with the aid of the tool, the tool mould includes a deforming arrangement for the armouring of the drive cable.

For example, pins, ribs or lands form the deforming arrangement, which engage the mould cavity. The pins, ribs or lands function in such a manner that contact is established between them and the armouring freed from the cable body when the tool mould, which is usually built up of two shells, is being closed, kinking or bending the armouring, whereby an anchor portion or an anchor element is formed. Thus, deformation of the armouring to increase the mechanical anchoring in the overmoulded part of the cable formed by the coupling element can be formed during closing operation of the mould. No additional process steps are needed for deforming the anchor element.

Since the drive cable has to have an accurate orientation in its guide when being employed, in order to be able to bring it into engagement with a toothed driving wheel or the like and still make it possible to join the coupling element to the structural element to be driven, the tool mould, in a preferred embodiment, includes a mating denticulation or negative profile, which engages the denticulation of the cable body when the drive cable engages the mould cavity. Thus, the denticulation of the cable is used for proper orientation of the cable in the overmoulding tool. Of course, alternative means for defined orientation of the cable in the mould are conceivable. Such a positioning means ensures the correct orientation of the cable in the mould with no additional effort, so that misalignment is avoided. Further, by the defined positioning of the cable in the mould, a defined peel and racking force for the cable and a defined overmoulded length are given.

The mating denticulation may be realised at a pinion or a slider of the tool mould, which is used for supplying and/or for removing the drive cable in or from the mould cavity and which may automatically operate. The slider can be provided with a driving unit.

Further advantages and advantageous configurations of the subject-matter of the invention can be taken from the description, from the drawing and from the claims.

Exemplary embodiments of the drive cable according to the invention and of the tool according to the invention are illustrated in a schematically simplified way in the drawing and will be explained in more detail in the following description. In the figures:

BRIEF DESCRIPTIONS OF THE DRAWING

FIG. 4 shows a view from above onto the drive cable according to FIG. 3;

FIG. 5 shows a face-side view of the drive cable according to FIG. 3 in the guide rail;

FIG. 6 shows an end region of an alternative embodiment of a drive cable having a coupling element;

FIG. 7 shows an end region of another embodiment of a drive cable having a coupling element;

FIG. 8 shows an end region of another embodiment of a drive cable having a coupling element;

FIG. 9 shows an end region of another embodiment of a drive cable having a coupling element;

FIG. 10 shows an end region of another embodiment of a drive cable having a coupling element;

FIG. 11 shows an end region of another embodiment of a drive cable having a coupling element;

FIG. 12 shows an end region of another embodiment of a drive cable having a coupling element;

FIG. 13 shows an end region of another embodiment of a drive cable having a coupling element;

FIG. 14 shows an end region of another embodiment of a drive cable having a coupling element;

FIG. 15 shows an end region of another embodiment of a drive cable having a coupling element;

FIG. 16 shows a face-side view of the drive cable according to FIG. 15 without the coupling element being illustrated;

FIG. 17 shows an end region of another embodiment of a drive cable having a coupling element;

FIG. 18 shows a face-side view of the cable according to FIG. 17, but without the coupling element being illustrated;

FIG. 31 shows a section through the tool according to FIG. 30 along line C-C in FIG. 30;

FIG. 32 shows a longitudinal section through another embodiment of a tool for moulding a coupling element to a drive cable;

DETAILED DESCRIPTION

Figure 1:
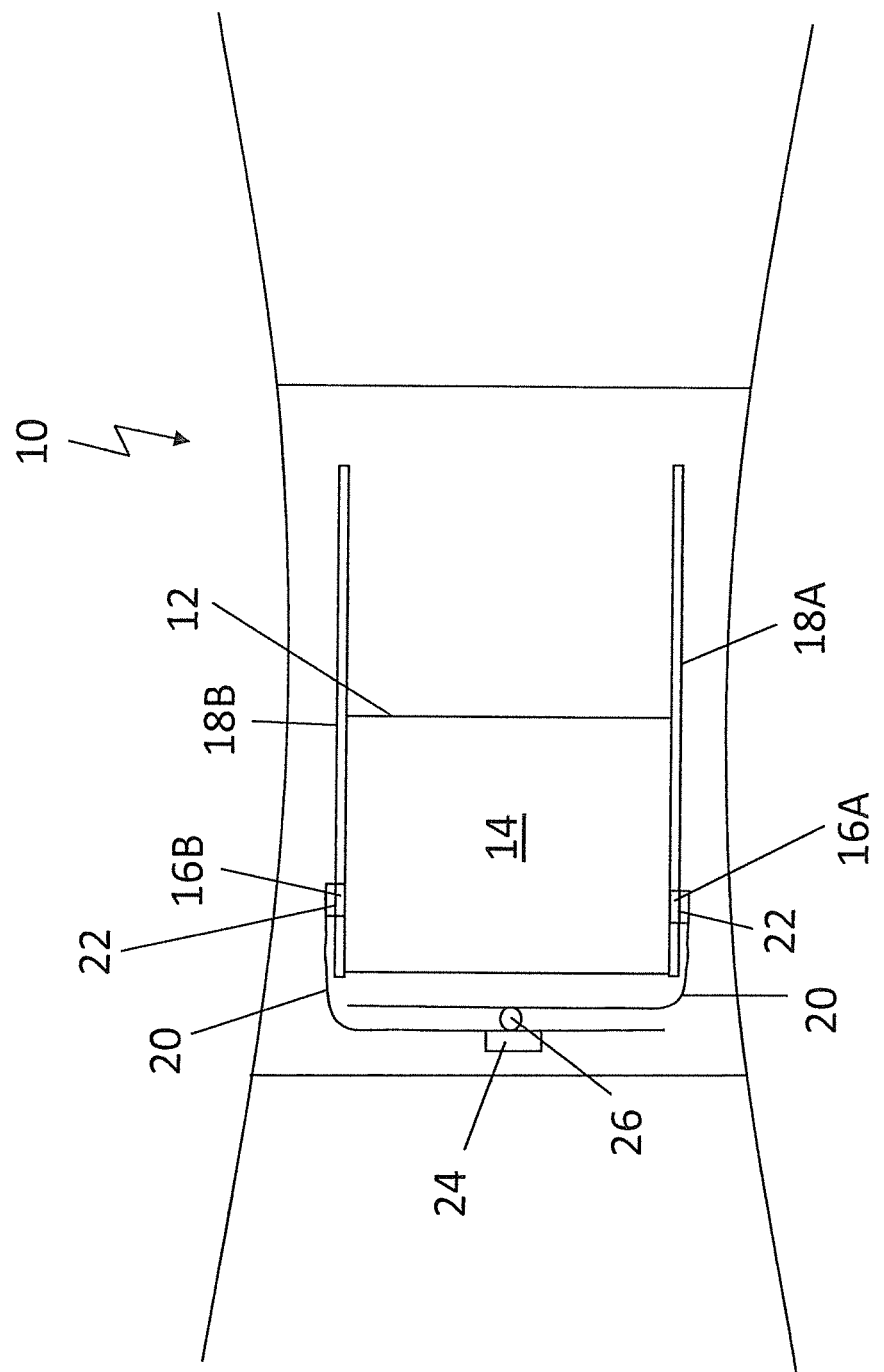
FIG. 1 shows a schematic view from above onto a vehicle roof having a drive unit for a movable lid element.
Figure 2:
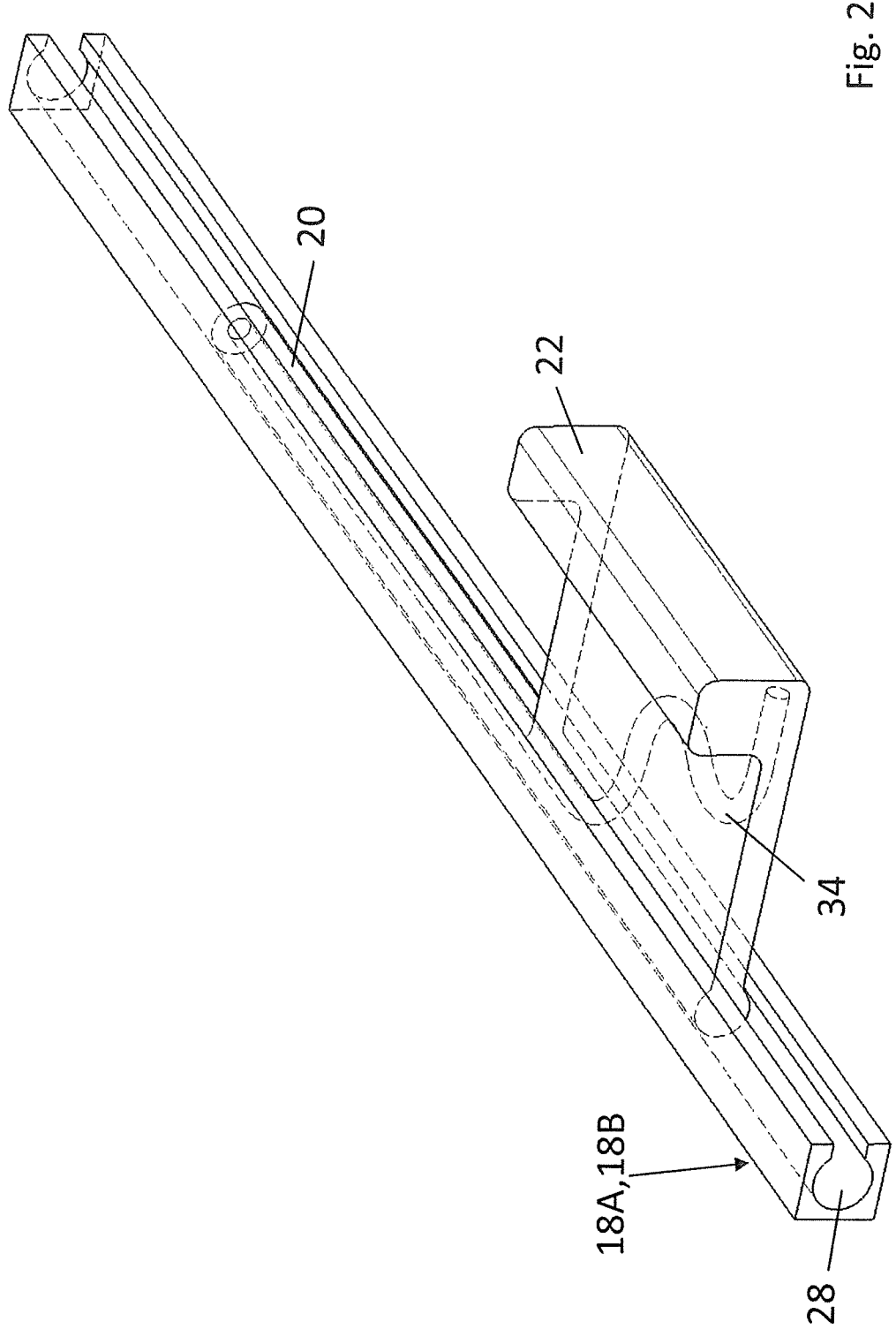
FIG. 2 shows a schematic view of a drive cable of the drive unit, said drive cable being guided in a guide rail.
Figure 3:
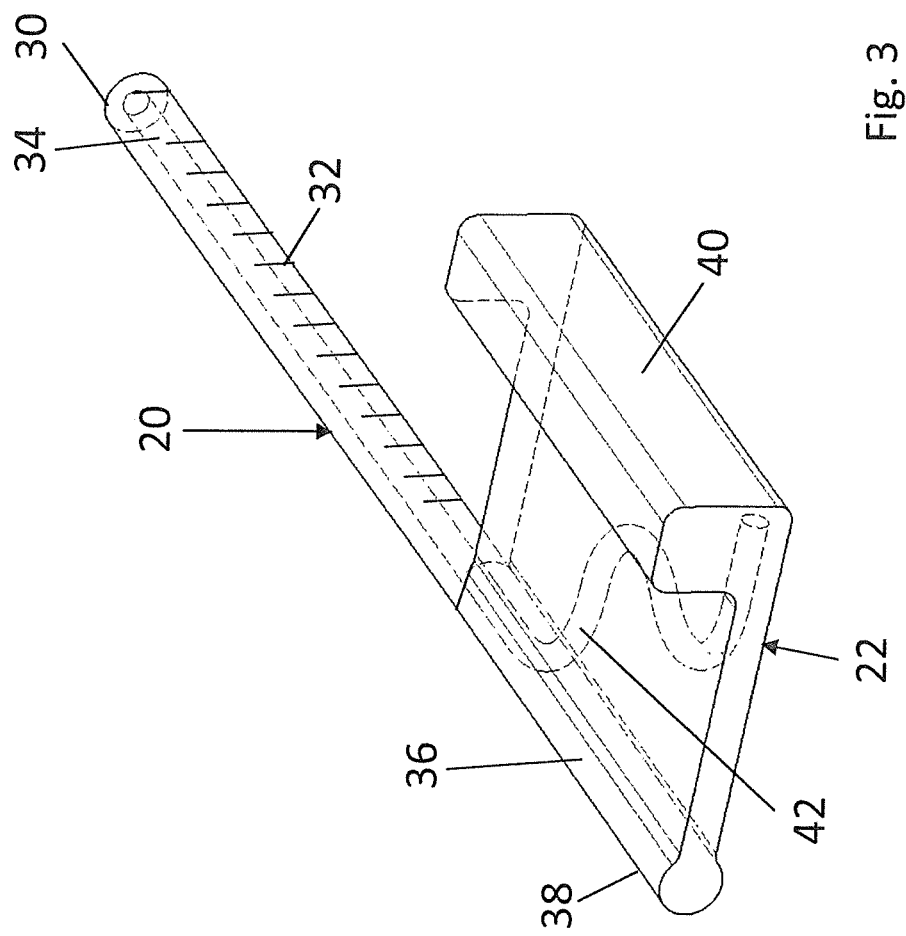
FIG. 3 shows a perspective view of the drive cable according to FIG. 2 on its own.

In FIG. 1, a vehicle roof 10 is shown which is part of a passenger car not being illustrated otherwise, and which includes a roof opening 12, which may selectively be closed or at the very least partially be cleared with the aid of a lid element 14. The lid element 14 thus constitutes a vehicle element, which is movable as against the vehicle structure and is part of a roof opening system.

In order to be able to displace the lid element 14, the roof opening system includes displacing kinematics, which, in relation to a vertical longitudinal centre plane of the roof on each of their two sides, include a drive slide 16A or 16B, which is guided in a respective guide rail 18A or 18B extending in the longitudinal direction of the roof.

For driving, a drive cable 20 that is rigid in compression and tension is connected to each drive slide 16A, 16B via a respective coupling element 22, which is formed from a plastics injection moulded section of the respective drive cable 20 and is connected to the respective drive slide 16A or 16B.

The drive cables 20 are guided to a common drive motor 24 via corresponding guide channels and engage with a common toothed driving wheel 26 of the drive motor 24.

The drive motor 24, the toothed driving wheel 26 and the drive cables 20, which are connected to the drive slides 16A and 16B via the coupling elements 22, hence form a drive unit for the lid member 14.

The drive cables 20, which are illustrated in a detailed fashion using FIGS. 2 to 5, and are guided in a respective guide channel 28 of the relevant guide rail 18A or 18B for the drive slides 16A and 16B, are each realised as plastics drive cable and each include a substantially cylindrical cable body 30 which is made of a bendable plastics material, and which, at the periphery, is provided with a denticulation 32, which extends in the axial direction of the drive cable 20 and is realised for engaging the toothed driving wheel 26 that forms a mating denticulation. The denticulation of the drive cable 20 assigned to drive slide 16A, is arranged on the side of the cable body 30 facing away from the roof opening 12, whereas the denticulation 32 of the drive cable 20 assigned to drive slide 16B is arranged on the side of the cable body 30 facing the roof opening 12.

Each of the drive cables 20 is moreover provided with an armouring 34, which is formed from a steel wire strand in the present case and reaches through the cable body 30 in the axial direction. Alternatively, the armouring 34 may also be made from another axially stiff and bendable material.

In a cable end portion 36, each of the drive cables 20 is provided with the coupling element 22 for being connected to the respective drive slide 16A or 16B. An injection moulded section which is made of a plastics material forms the coupling element 22, which adjoins the cable body 32 with a joining portion 38. The joining portion 38 has a peripheral face or mantle, which is flush with the peripheral face of the cable body 30, such that the coupling element 22 may be guided in the guide channel 28 of the relevant guide rail 18A or 18B, together with the cable body 30. A connecting portion 40 in the manner of a tab projects from the joining portion 38 in the direction of the respective drive slides 16A or 16B. The connecting portion 40, as it can in particular be learned from FIG. 5, has an at least nearly L-shaped cross-section for connecting to the respective drive slide.

In order to guarantee that the coupling element 22 is a racking-resistant part of the drive cable 20, the armouring 34, which is guided out of the cable body 30 into the coupling element 22, forms an internal anchor element 42, which is formed from an end portion of the armouring 34 having been bent several times and initially extends, starting from the cable body 30, in the joining portion 38 and then through the connecting portion 40 close to the face side of the coupling element 22. In this way, a large joining and anchoring face can be made available by the armouring 34, and hence a large anchor force for the coupling element 22. The coupling element 22, which adjoins the cable body 30 and has been moulded thereon according to an injection moulding method, thus reaches around the armouring 34 in a direct manner, wherein the anchor element 42 formed by the armouring 34, when projected in the longitudinal direction of the cable, is to outside of the cross-section of the cable body 30 and is embedded into the coupling element 22.

In FIG. 6, an alternative embodiment of a drive cable 20 is illustrated, serving to drive a sliding roof lid of the type that is illustrated in FIG. 1 and comprising a cable body 30, in correspondence with the embodiment according to FIGS. 2 to 5, which is provided with a denticulation and through which an armouring 34 reaches in the axial direction. In a cable end portion 36, the armouring 34 leaves the cable body 30, that means the cable body 30 is removed in the cable end portion 36. In the cable end portion 36, a coupling element 22 is moulded onto the armouring 34 in a direct manner, said coupling element being realised as a plastics injection moulded section and including a joining portion 38, which reaches around the armouring 34 and whose periphery/mantle is flush with the periphery of the cable body 30. A connecting portion 40 being illustrated in dashed lines in the drawing projects, in relation to the axis of the cable 20 in the transverse direction or radial direction, from the joining portion 38, which adjoins the cable body 30, the drive cable 20 being able to be joined to a drive slide of the roof opening mechanism via said connecting portion 40. With the embodiment in accordance with FIG. 6, the armouring 34 forms the anchoring for the coupling element 22.

In FIG. 7, another embodiment of a drive cable 20 is illustrated, which largely corresponds to the embodiment according to FIG. 6, but differs from the same in that it includes two armourings 34 each of which constitutes an armouring harness, and which are freed from a cable body 30 in a cable end region 3, but around which a coupling element 22 with the joining portion 38 thereof reaches. Apart from that, the drive cable 20 in accordance with FIG. 7 corresponds to the drive cable according to FIG. 6.

In FIGS. 8 to 14, drive cables 20 are in each instance illustrated, formed from a cable body 30, in correspondence with the aforedescribed embodiments, said cable body being provided, over at least part of its periphery, with a denticulation extending in the longitudinal direction of the cable for engaging a toothed driving wheel of a drive motor. An armouring 34 which is realised as a wire strand, and which extends in the axial direction of the cable body 30, reaches through the cable body 30. In a respective cable end portion 36, the armouring 34 is in each instance freed from the cable body 30 so that it is possible that it is provided with a coupling element 22 for being joined to a drive slide of a roof opening mechanism. The armouring 34 is deformed in the respective cable end portion 36 for forming an anchor element 42 for the coupling element 22 that is realised as a plastics injection moulded section. The respective anchor element 42 provides mechanical anchoring of the coupling element 22.

In the embodiment according to FIG. 8, the armouring 34 is kinked four times for forming the anchor element 42.

In the embodiment illustrated in FIG. 9, the armouring 34, in the cable end portion 36, forms an anchor element 42 in the form of a loop.

In the embodiment in accordance with FIG. 10, the armouring 34, in the cable end portion 36, forms an anchor element 42 in the form of a loop, wherein the end of the armouring 34 once more is folded around an axially running portion of the armouring 34.

In the embodiment in accordance with FIG. 11, the armouring 34, in the cable end portion 36, forms a knot as the anchor element 42 for the coupling element 22.

In the embodiment in accordance with FIG. 12, the individual filaments of the wire-like armouring 34 are detached from one another at their ends, such that the armouring 34 is in a fanned-out state for realising an anchor element 42.

In the embodiment in accordance with FIG. 13, the armouring 34 that consists of a wire strand, in the cable end portion 36, is in a widened state in a region spaced apart from the armouring end, such that an anchor element 42 is formed.

In the embodiment in accordance with FIG. 14, the wire-like armouring 34, in the cable end portion 36, for realising an anchor element 42 in correspondence with the embodiment according to FIG. 13, is likewise in a widened state, in the region spaced apart from the armouring end, wherein the individual filaments of the wire are braided or knotted with one another.

In FIGS. 15 and 16, another embodiment of a drive cable 20 having a cable body 30 which is made of a bendable plastics is illustrated, an armouring 34 reaching through said cable body in the axial direction. In a cable end portion 36, the armouring 34 is freed from the cable body 30 and is provided with an anchor element 42 realised as a crimp sleeve. The crimp sleeve 42 has been slid onto the armouring 34 and has been crimped there for the purpose of fixation. A coupling element 22 realised as an injection moulded section encompasses the armouring 34 and the anchor element 42, the drive cable 20, in accordance with the above-described embodiments, being able to be connected to a drive slide of roof opening kinematics via said coupling element 22. If the at least one armouring has an excentric position with regard to the cable axis, the crimp sleeve may be provided with an excentric hole for inserting the armouring.

In FIGS. 17 and 18, a drive cable 20 is illustrated largely corresponding to the drive cable according to FIGS. 15 and 16, but differing from the same in that a sheet metal tab, which forms an anchor element 42, has been crimped in the cable end portion 36 instead of a crimp sleeve. The sheet metal tab extends in the transverse direction of the cable and is completely embedded into the coupling element 22 realised as a plastics injection moulded section.

Figure 19:
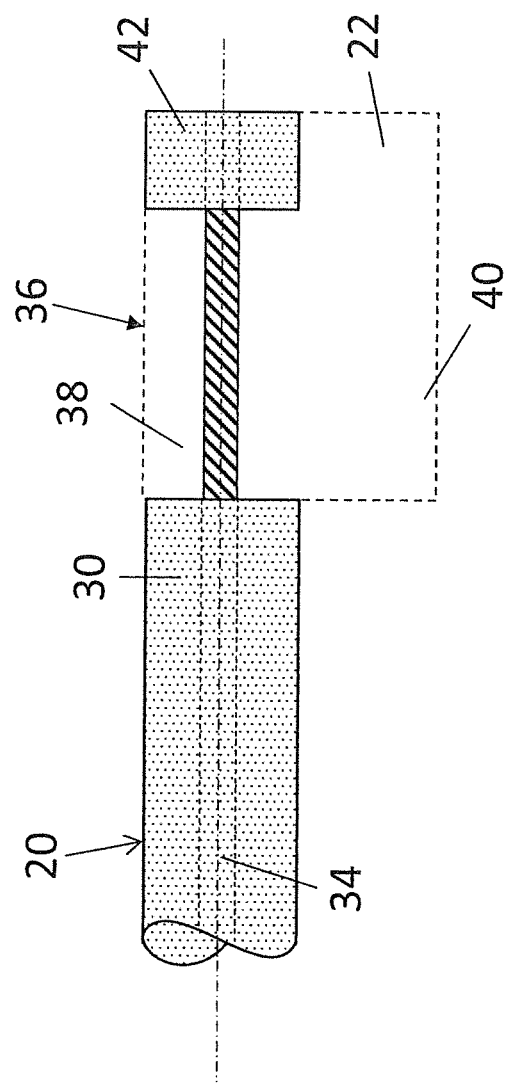
FIG. 19 shows an end region of another embodiment of a drive cable having a coupling element.

In FIG. 19, a drive cable 20 is illustrated including, in correspondence with the above-described embodiments, a cable body 30, through which an armouring 34 reaches. In a cable end portion 36, the armouring 34, in the region spaced apart from the cable end, is freed from the cable body 30 in an anchoring portion. At the cable end, a portion of the cable body 30 acting as an annular collar thus remains, which serves as an anchor element 42 for a coupling element 22 for connecting the drive cable 20 to a drive slide of a roof opening mechanism. The coupling element 22 directly has been moulded onto the armouring 34 between the anchor element 42 and the cable body 30.

Figure 20:
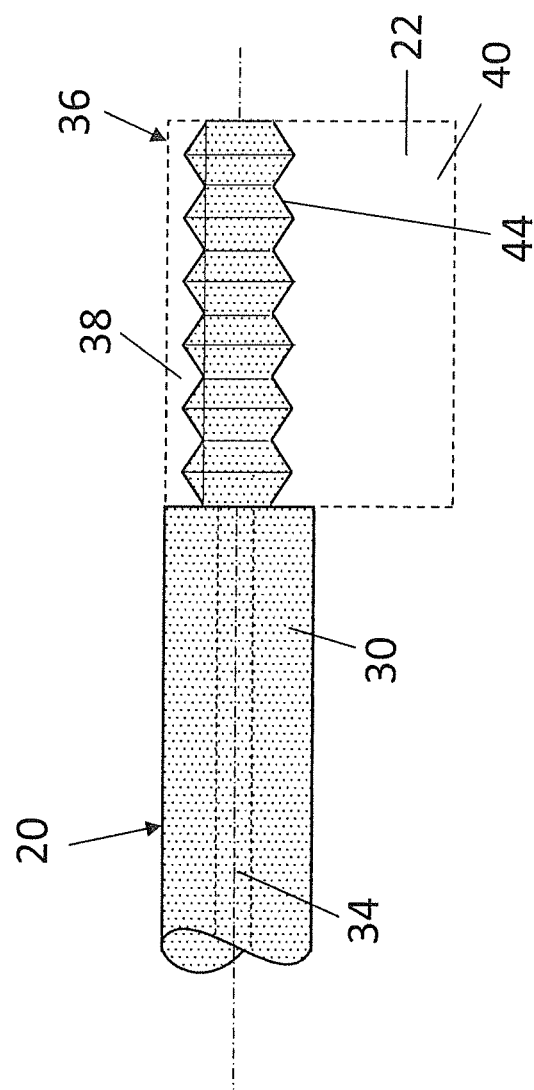
FIG. 20 shows an end region of another embodiment of a drive cable having a coupling element.

In FIG. 20, a drive cable 20 formed from a cable body 30 is illustrated, through which cable body an armouring 34 which is made of a steel wire strand reaches in the axial direction. In a cable end portion 36, the cable body 30 has been worked at its periphery, to be precise in such a manner that the peripheral face is realised like ribs for realising an anchor face 44. A coupling element 22, which constitutes a plastics injection moulded section, is in turn anchored at the anchor face 44.

Figure 21:
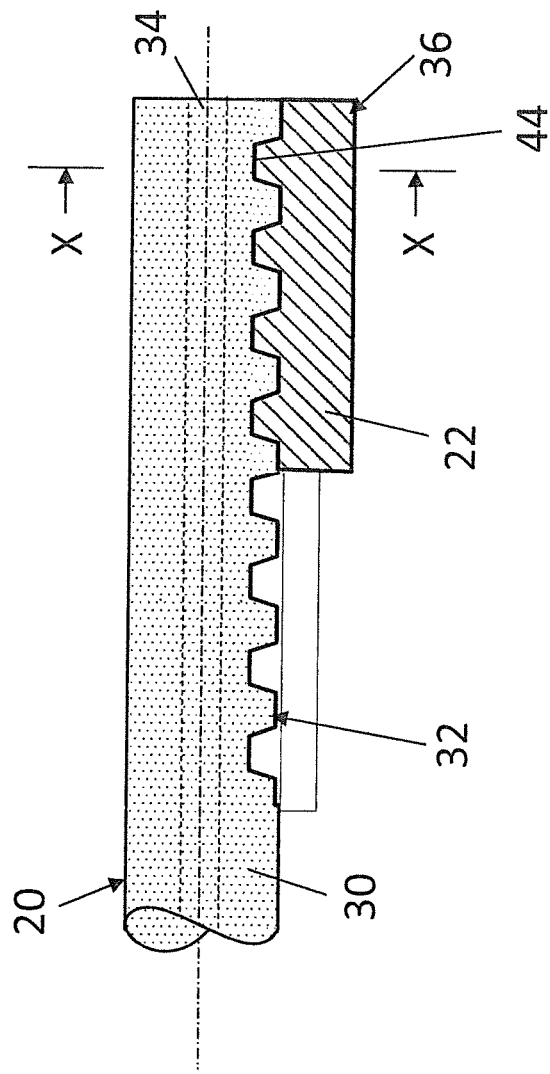
FIG. 21 shows an end region of another embodiment of a drive cable having a coupling element.
Figure 22:
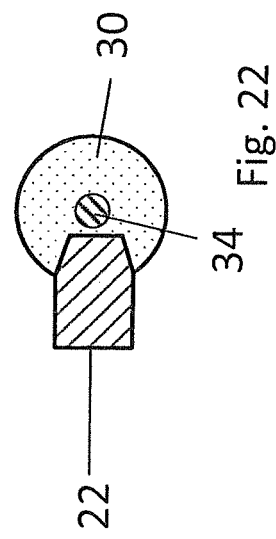
FIG. 22 shows a section through the drive cable according to FIG. 21 along line X-X in FIG. 21.

In FIGS. 21 and 22, another embodiment of a drive cable 20 including a cable body 30 is illustrated, which cable body is provided with a denticulation 32 at its periphery. In the axial direction, an armouring 34 reaches through the cable body 30. In a cable end portion 36, in the region of the denticulation 32, a coupling element 22 is moulded, which constitutes a plastics injection moulded section and serves to connect the drive cable 20 to a drive slide of a sliding roof mechanism. The denticulation 32 forms an anchor face 44 for the coupling element 22 in the cable end portion 36.

Figure 23:
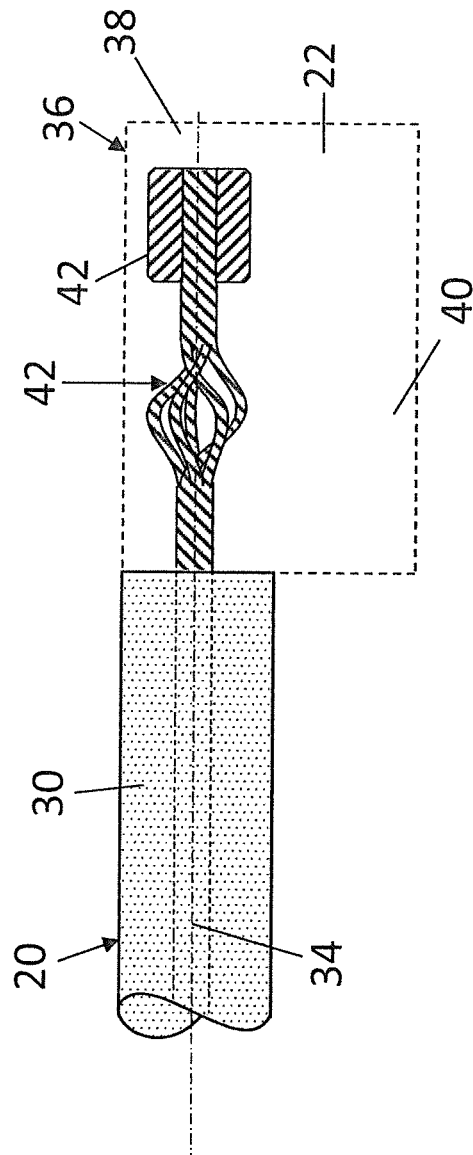
FIG. 23 shows an end region of another embodiment of a drive cable having a coupling element.

In FIG. 23, another embodiment of a drive cable 20 being a combination of the embodiments illustrated in FIGS. 14 and 15 is illustrated. Said drive cable thus comprises, in a cable end portion 36, for realising anchor elements 42, a widened dissolved armouring portion on the one hand as well as a crimp sleeve, on the other hand, which has been crimped onto the end of the armouring 34.

Figure 24:
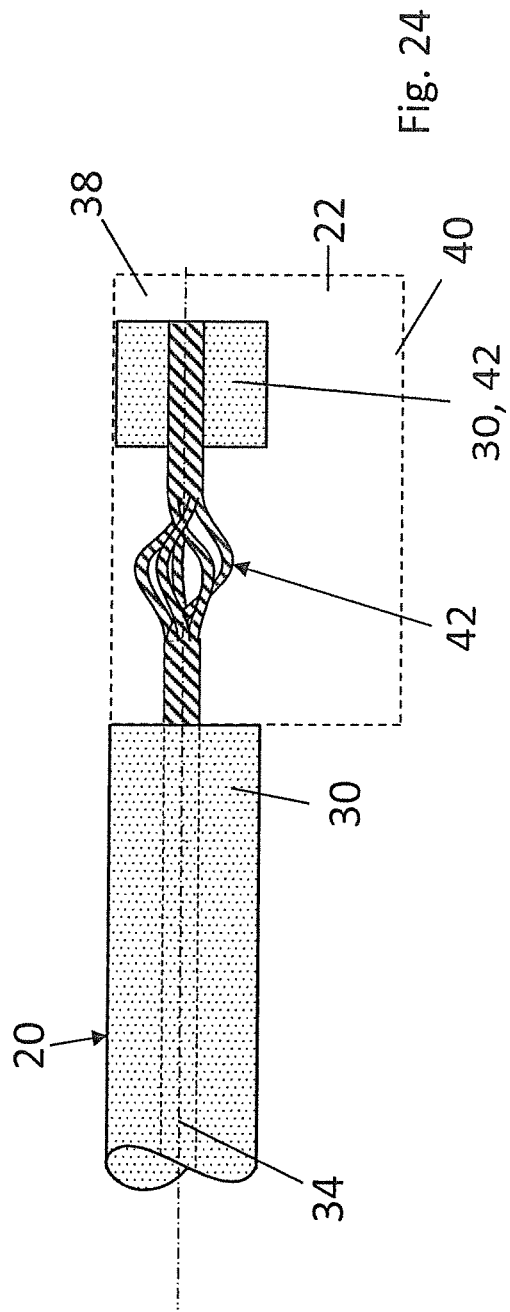
FIG. 24 shows an end region of another embodiment of a drive cable having a coupling element.

In FIG. 24, a drive cable 20 being a combination of the embodiments in accordance with FIGS. 14 and 19 is illustrated. For realising anchor elements 42 for a coupling element 22 realised as an injection moulded section, a widened and dissolved armouring portion of the strand-like armouring and a face-side annular collar which is made of the cable body 30 are therefore disposed in the cable end portion 36.

Figure 25:
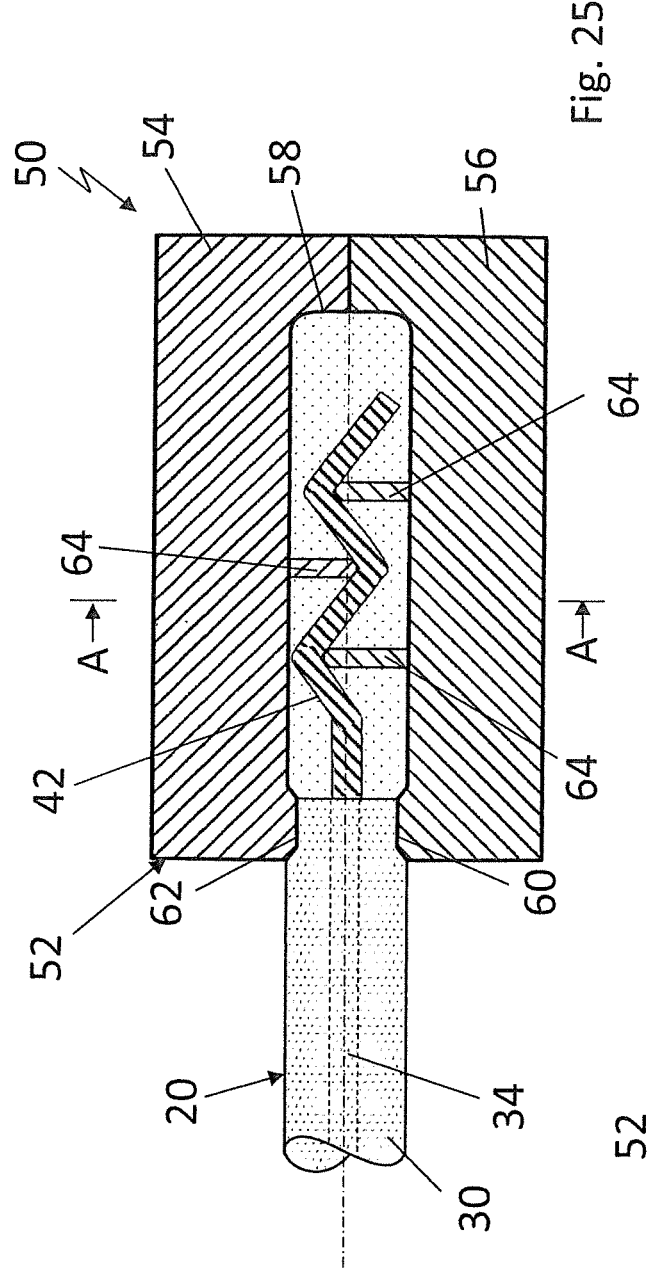
FIG. 25 shows a longitudinal section through a tool for moulding a coupling element to a drive cable.
Figure 26:
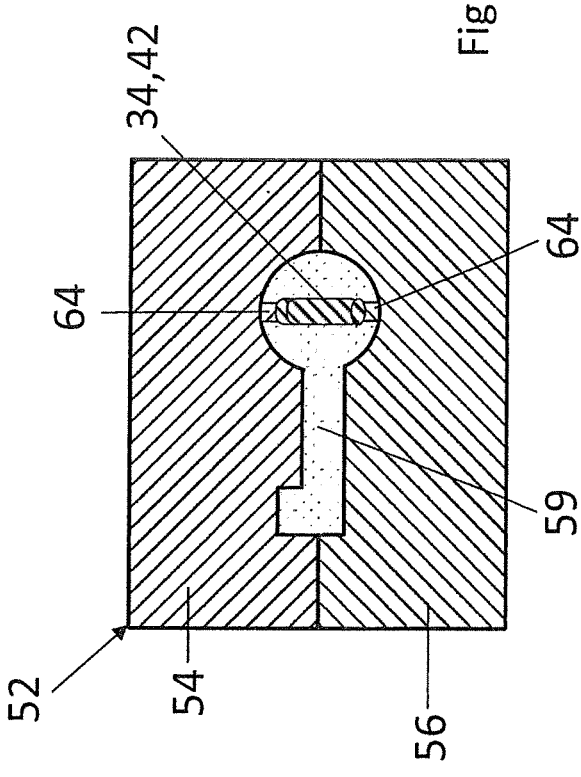
FIG. 26 shows a section through the tool according to FIG. 25 along line A-A in FIG. 25.

In FIGS. 25 and 26, a tool for moulding a coupling element onto a drive cable 20 of the kind illustrated in FIG. 8 according to an injection moulding process is shown. The tool 50 comprises a tool mould 52 having an upper tool 54 and a lower tool 56, and limiting a mould cavity 58 for moulding the coupling element. The tool mould 52, in the closed position illustrated in the drawing, has an opening 60, via which the drive cable 20 may engage the mould cavity 58. The drive cable 20, which may be provided with the coupling element 22 with the aid of the tool 50, has, as already described above, a cable body 30 having a cylindrical shape in general and a denticulation, an armouring 34 reaching through said cable body in the axial direction. In a cable end portion 36, the armouring is freed from the cable body 30, i.e. in the cable end portion 36, the cable body 30 is removed from the armouring 34 before the cable 20 is inserted into the tool mould 52. The tool mould 52, in the region of the opening 60, is provided with an annular collar 62, such that the opening 60 has an inside diameter which is smaller than the outside diameter of the cable body 30, so that the tool mould 52 presses into the polymer of the cable body during its closing. Thereby, the elasticity of the polymer of the cable body 30, in the closed position of the tool mould 52, may be employed for sealing the mould cavity 58, wherein the cylindrical shape of the cable body 30 improves the sealing properties.

In the mould cavity 58, three pins or lands 64 are arranged, which constitute a deforming installation for the armouring 34 and with the aid of which, when the tool mould 52 is being closed, the armouring portion 34 freed from the cable body 30 may be deformed for realising an anchor element 42. Two of the pins or lands 64 engage the mould cavity 58 from below and one of the pins or lands 64 engages the mould cavity 58 from the top, between the two other pins or lands 64. By way of the deforming installation formed by the pins or lands 64, an anchor element 42 for the coupling element 22 at the drive cable 20 can thus directly be realised in the mould for producing the coupling element 22.

Figure 27:
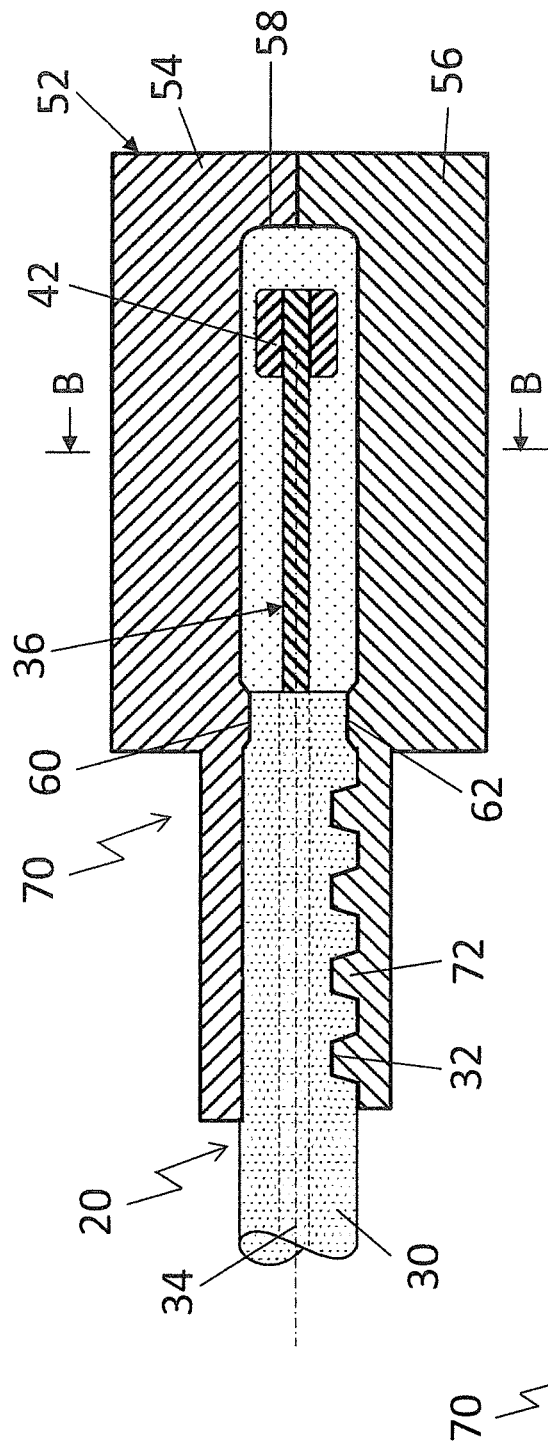
FIG. 27 shows a longitudinal section through an alternative embodiment of a tool for moulding a coupling element to a drive cable.
Figure 28:
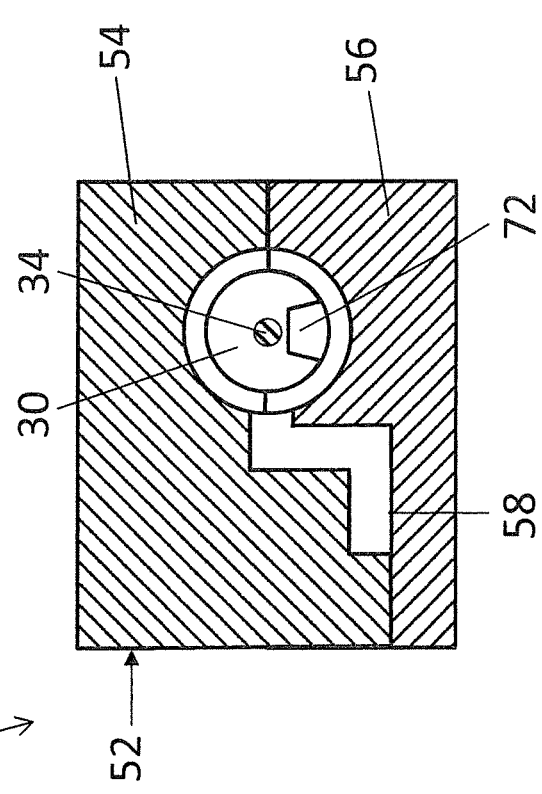
FIG. 28 shows a section through the tool according to FIG. 27 along line B-B in FIG. 27.

In FIGS. 27 and 28, a tool 70 including a tool mould 52 is illustrated, and formed from an upper tool 54 and from a lower tool 56, which together limit a mould cavity 58 for moulding a coupling element of a drive cable 20 of the kind illustrated in FIG. 15. As already described above, the drive cable 20 has a substantially cylindrical cable body 30 having a denticulation 32 and an armouring 34, which reaches through the cable body 30 in the axial direction and leaves the cable body 30 in a cable end portion 36. At the free end of the armouring 34, a crimp sleeve is fixed, which serves as an anchor element 42 for a coupling element that can be moulded thereon with the aid of the tool 70. In order to be able to exactly position the drive cable 20 regarding the orientation of the coupling element 22 to be injected as against the denticulation, the lower tool 56 includes a mating denticulation 72, which may be brought into engagement with the denticulation 32 of the drive cable 20.

Moreover, the mould cavity 58, on the side of the cable body 30, is limited by an annular collar 62, whose inside diameter limits an opening 60, via which the drive cable 20 engages the mould cavity 58. In the closed position of the tool mould 52, the annular collar 62 engages the cable body 30 without using further sealing elements, wherein the plastics of the cable body 30 is used for sealing the mould cavity 58.

Figure 29:
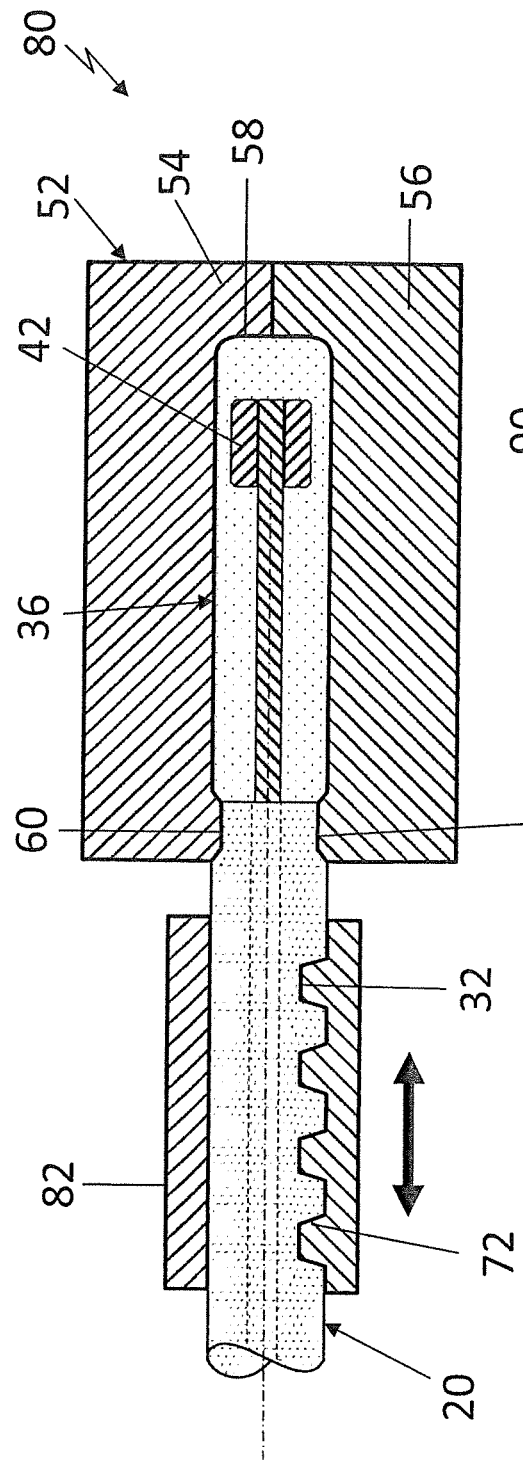
FIG. 29 shows a longitudinal section through an alternative embodiment of a tool for moulding a coupling element comprising a slider to a drive cable.

In FIG. 29, another embodiment of a tool 80 for moulding a coupling element onto a drive cable 20 is illustrated. The tool 80 largely corresponds to the tool according to FIGS. 27 and 28, but differs from the same in that it is provided with a slider 82, with the aid of which the drive cable 20 can be introduced into the mould cavity 58 and be removed from the mould cavity 58 after the coupling element 22 has been moulded. A mating denticulation 72 is realised at the slider 82, which denticulation may be brought into engagement with the denticulation 32 of the drive cable 20, such that the drive cable 20 has an exact position as against the mould cavity 58 in respect of its denticulation 32. Hence, it can be guaranteed that the coupling element 22 to be moulded likewise has a defined position as against the denticulation 32 of the drive cable 20.

Figure 30:
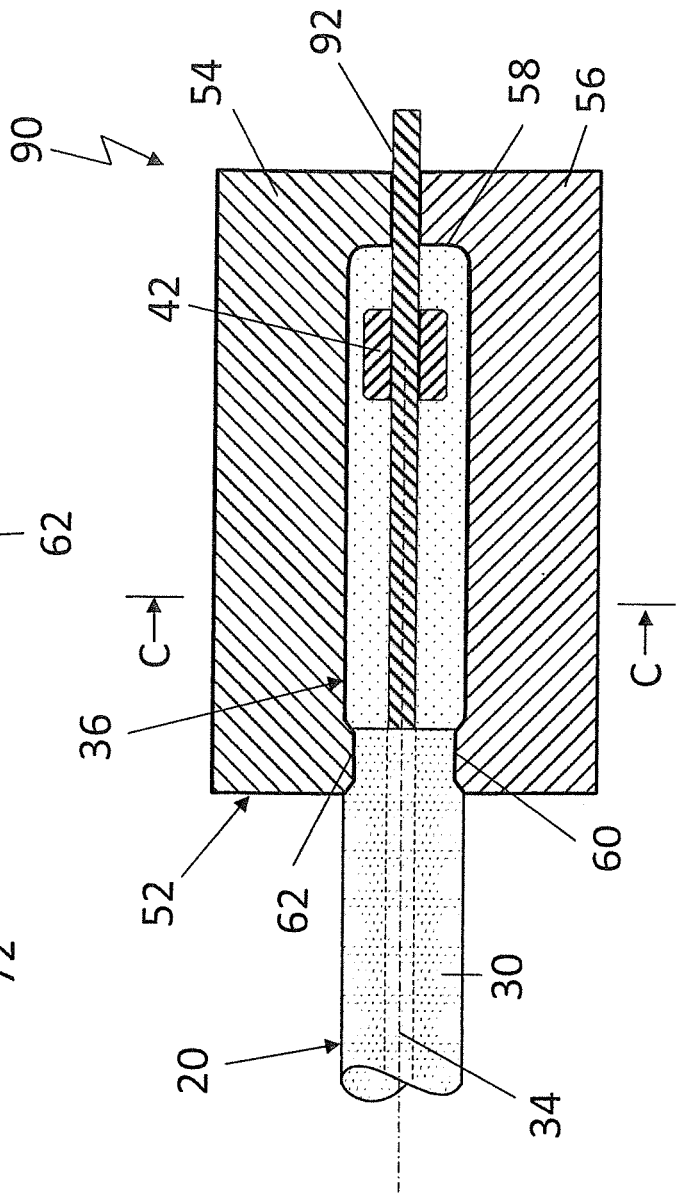
FIG. 30 shows a longitudinal section through another embodiment of a tool for moulding a coupling element to a drive cable having an armouring holder.

In FIGS. 30 and 31, a tool 90 is illustrated, which likewise serves to mould a coupling element realised as an injection moulded section onto a drive cable 20. The drive cable 20 has a cable body 30 having an armouring 34, which leaves the cable body 30 in a cable end portion 36 and is provided with an anchor element 42 for the coupling element 22, said anchor element being realised as a crimp sleeve. On the side facing away from an inlet opening 60 for the drive cable 20, a mould cavity 58 of the tool 90 has a holding opening 92, at which an end portion of the armouring 34 can be jammed. Hence, the cable end portion 36 or the armouring 34 may be kept tensioned in the mould cavity 58. After the coupling element 22 has been moulded onto the drive cable 20, the excess length of the armouring 34, which leaves the coupling element 22 on the side facing away from the cable body 30, can be cut to length.

In FIG. 32, another embodiment of a tool 100 for joining a coupling element is illustrated, serving to connect a drive cable 20 to a drive slide of a sliding roof mechanism. In correspondence with the embodiment according to FIGS. 30 and 31, the drive cable 20 has a cable end portion 36, which abuts on a cable body 30 in the axial direction and in which an armouring 34, which leaves the cable body 30, is provided with an anchor element 42 realised as a crimp sleeve. In order to keep the armouring portion that is provided with the crimp sleeve 42, and freed from the cable body 30 tensioned in a mould cavity 58 of the moulding tool, an upper tool 54 and a lower tool 56 each include a holding rib 102. Between the holding ribs 102, the armouring 34 may be jammed in the mould cavity 58, such that the coupling element 22 may directly be injection moulded around the armouring 34 including the anchor element 42. Apart from that, tool 100 corresponds to the moulding tool illustrated in FIGS. 30 and 31.

Figure 33:
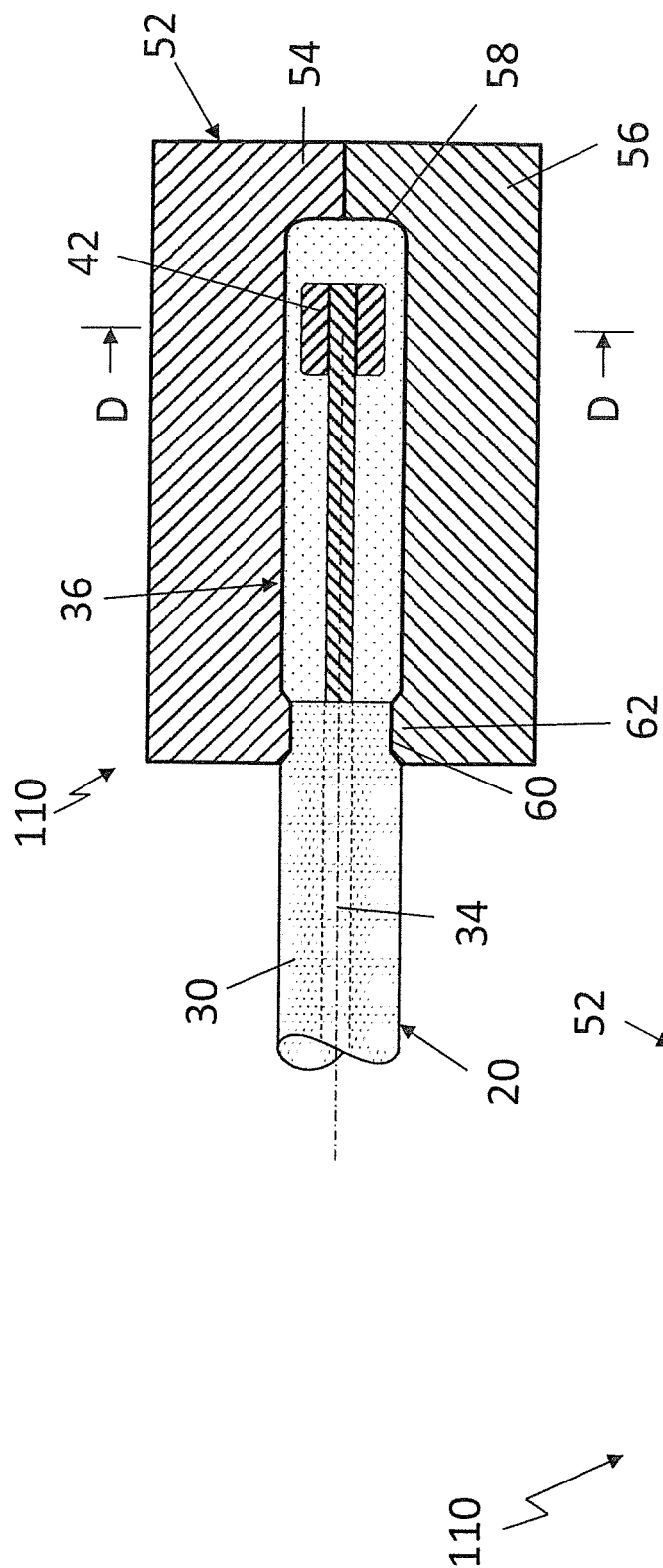
FIG. 33 shows a longitudinal section through another embodiment of a tool for moulding a coupling element to a drive cable.
Figure 34:
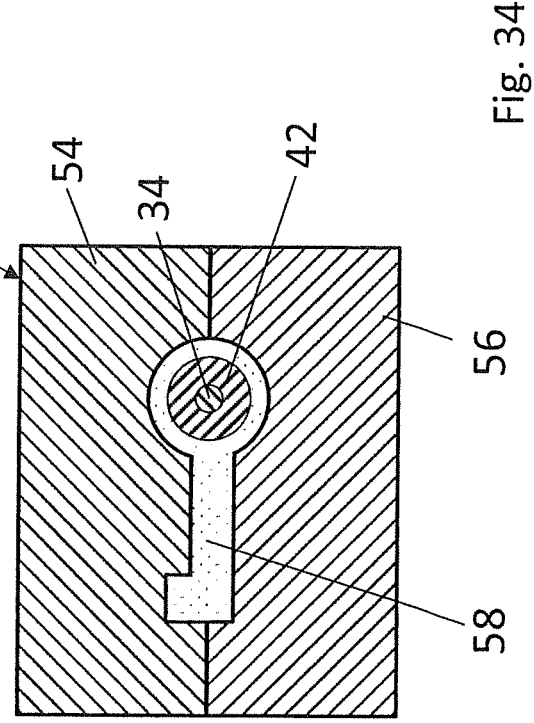
FIG. 34 shows a section through the tool according to FIG. 33 along line D-D in FIG. 33.

In FIGS. 33 and 34, a tool 110 is illustrated, which largely corresponds to the tool according to FIG. 32, but differs from the same in that it does not include any holding ribs for the armouring 34 of the drive cable 20. The tool 110 has an opening 60, too, which, because of an annular collar 62 being present, has an inside diameter that is smaller than the outside diameter of a cable body 30 of the drive cable 20. The cable body 20 or the plastics thereof may therefore be used for sealing the mould cavity 58.

Figure 35:
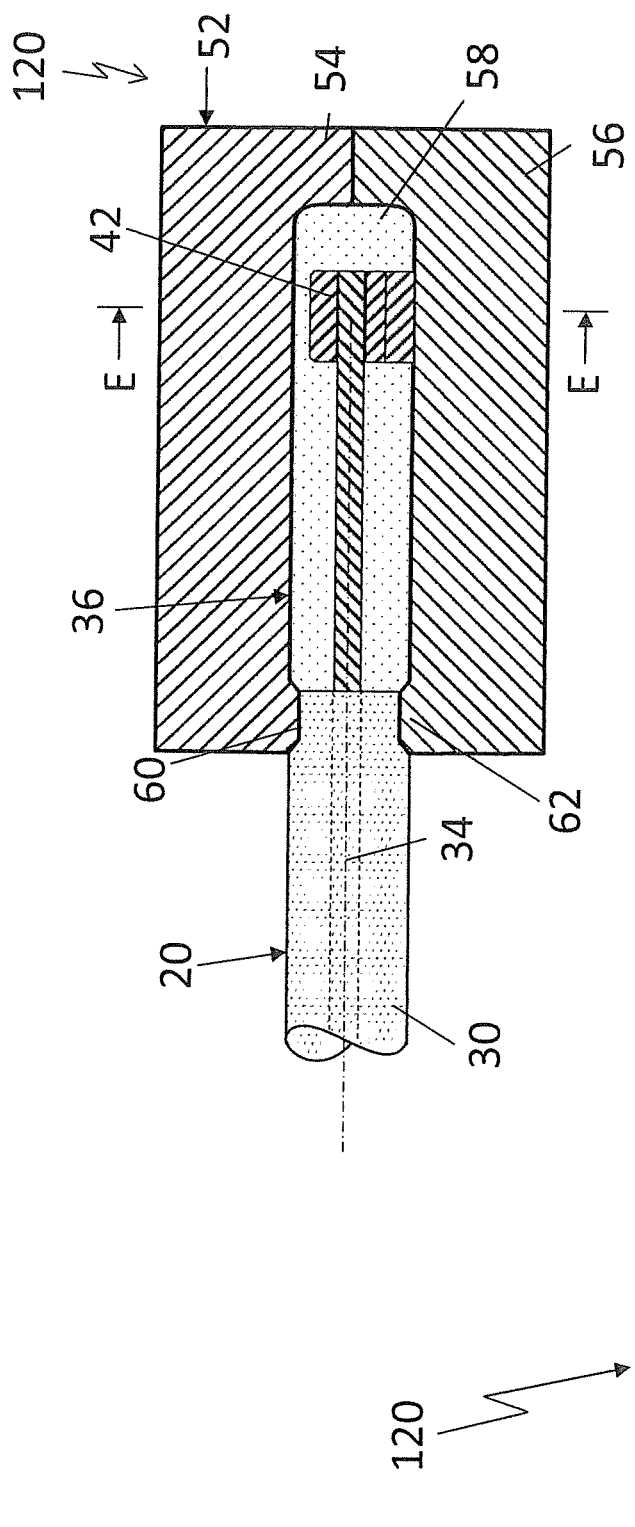
FIG. 35 shows a longitudinal section through another embodiment of a tool for moulding a coupling element to a drive cable.
Figure 36:
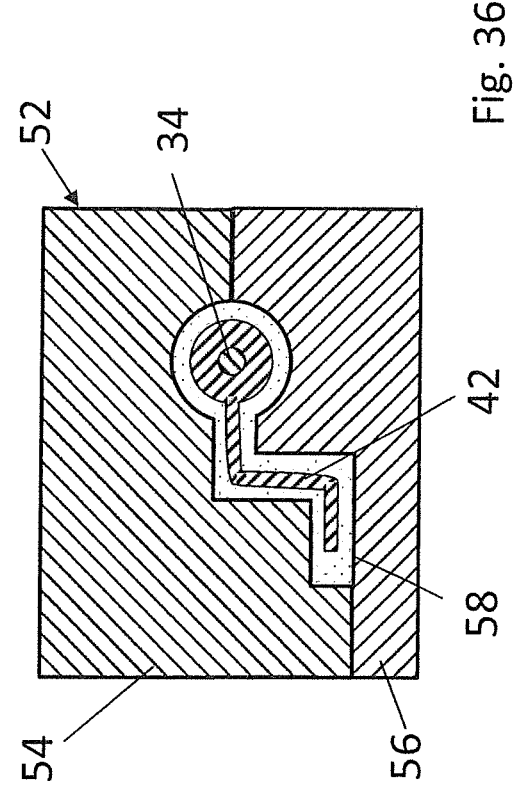
FIG. 36 shows a section through the tool according to FIG. 33 along line E-E in FIG. 33.

In FIGS. 35 and 36, a tool 120 for moulding a coupling element onto a drive cable 20 of the kind illustrated in FIG. 18 is shown. The mould cavity 58 of the tool 120 has, as FIG. 36 shows a cross-section of tool 120 along section E-E of FIG. 35, having an S-shaped cavity 58. In the cavity 58, an anchor tab of twice bent sheet metal is crimped onto the armouring 34 of the drive cable thereby forming an anchor element 42 for the coupling element 22 at the drive cable 20.

LIST OF REFERENCE NUMERALS 10 vehicle roof
12 roof opening
14 lid element
16A, B drive slide
18A, B guide rails
20 drive cable
22 coupling element
24 drive motor
26 driving toothed wheel
28 guide channel
30 cable body
32 denticulation
34 armouring
36 cable end portion
38 joining portion
40 connecting portion
42 anchor element
44 anchor surface
50 tool
52 tool mould
54 upper tool
56 lower tool
58 mould cavity
60 opening
62 annular collar
64 lands/pins
70 tool
72 mating denticulation
80 tool
82 slider
90 tool
92 holding opening
100 tool
102 holding ribs
110 tool
120 tool

The invention claimed is:

1. A drive cable for actuating an element being movable relative to a structure, comprising a cable body which is made of one or more plastics, and which cable body comprises a denticulation extending in the axial direction for engaging a mating denticulation as well as at least one armouring, which extends through the cable body in the axial direction, wherein a coupling element which is realised as a moulded section, and which is moulded in a cable connecting region so as to adjoin the cable body and includes a connecting portion for being coupled to the moveable element, wherein the coupling element encases the armouring and is directly moulded onto the same in a region free of at least one of the cable body and the armouring is provided with an anchor element for the coupling element.

2. The drive cable claim 1, wherein a deformed armouring portion forms the anchor element.

3. The drive cable claim 2, wherein the deformed armouring portion forms an armouring loop.

4. The drive cable claim 2, wherein the deformed armouring portion, being projected in the longitudinal direction of the cable, is outside of the cable body and is embedded into the coupling element.

5. The drive cable claim 1, wherein at least one wire comprising filaments forms the armouring, which filaments are in one of a disentangled and widened state for forming the anchor element.

6. The drive cable claim 1, wherein the anchor element is a separate piece, which is fixed to the armouring.

7. The drive cable claim 1, wherein an end-side portion of the cable body forms the anchor element, an armouring portion abutting on said end-side portion in the longitudinal direction of the cable, and the coupling element directly being moulded onto the armouring portion.

8. The drive cable claim 1, wherein the cable body, at the periphery, includes a structured anchor surface for the coupling element.

* * * * *